Patented Mar. 27, 1923.

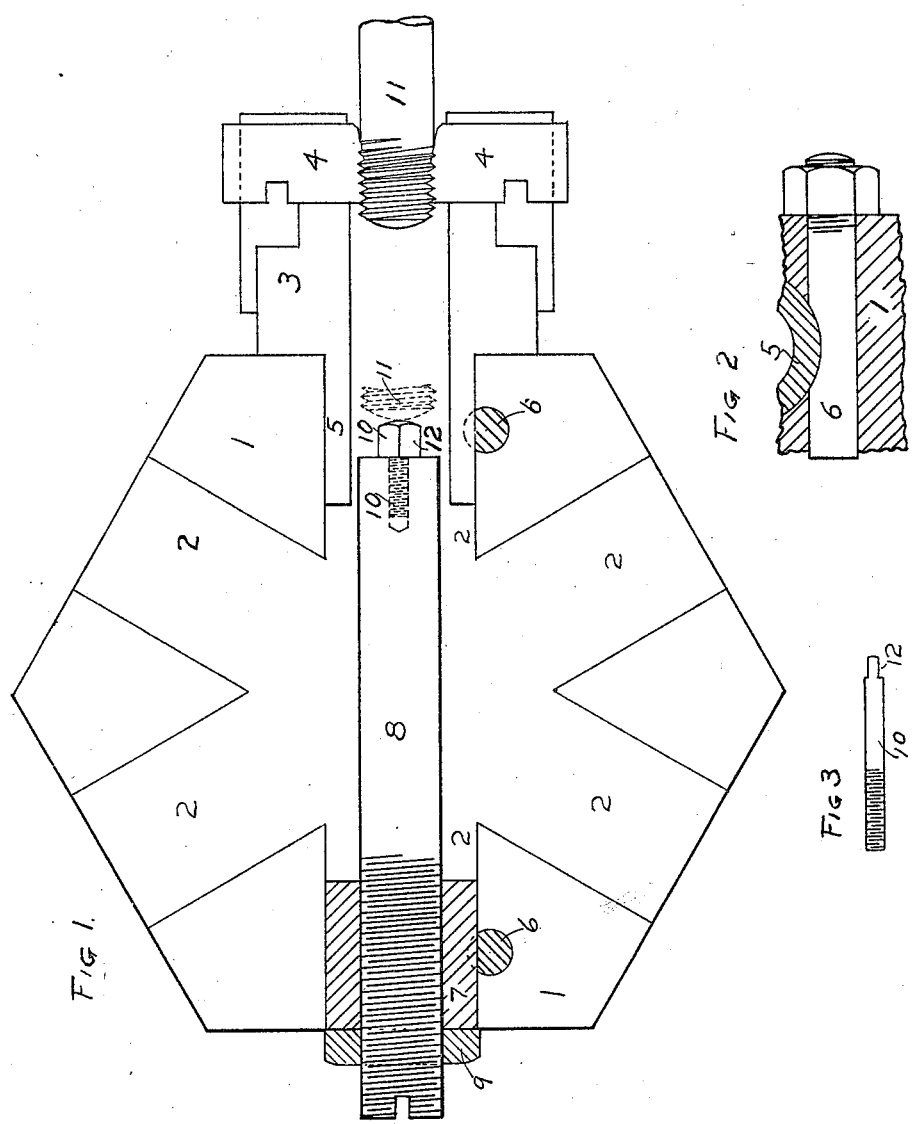

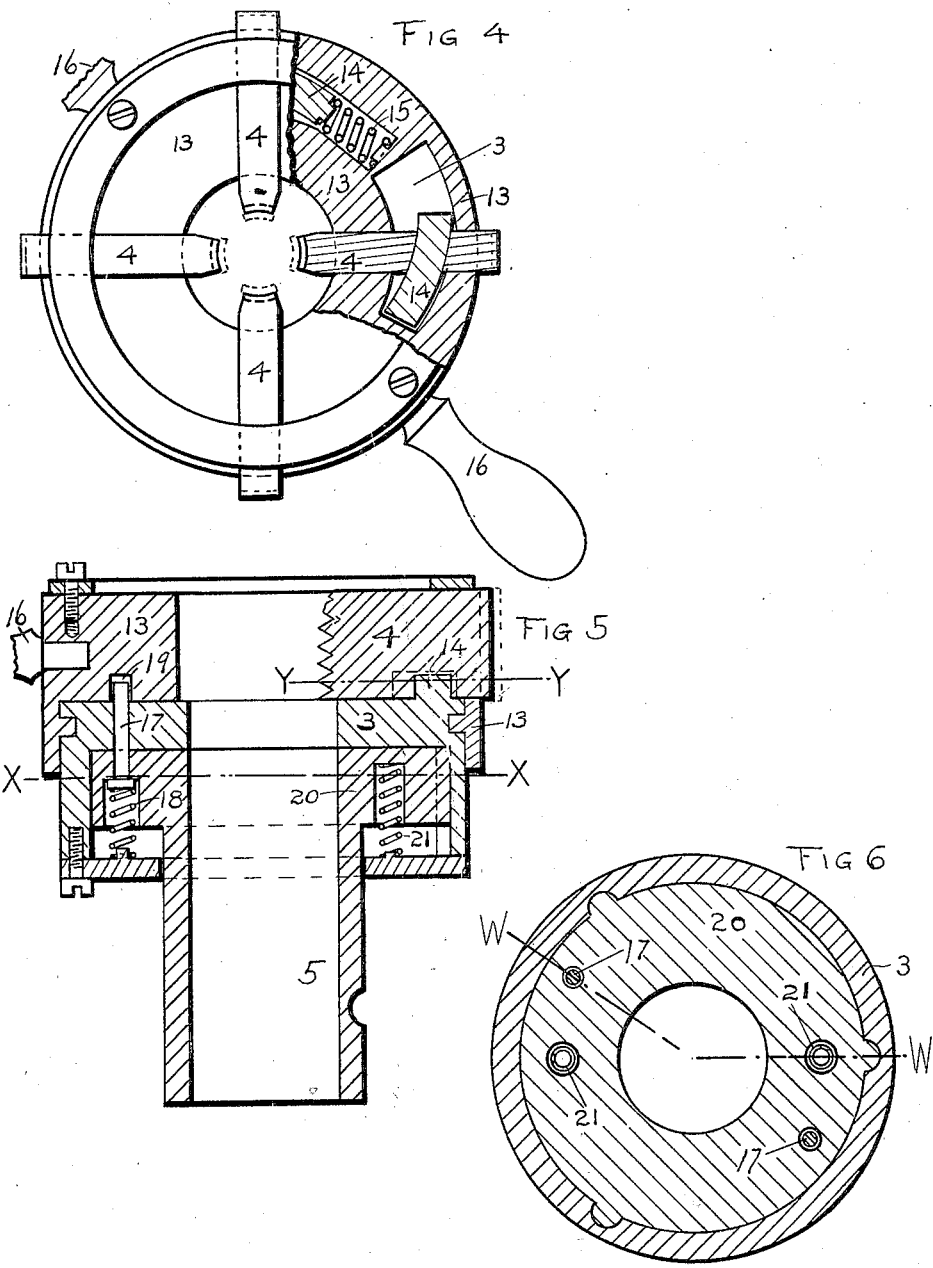

1,449,381

UNITED STATES PATENT OFFICE.

WILLIAM G. CANNOM, OF LANSING, MICHIGAN, ASSIGNOR OF ONE-HALF TO WILLIAM E. MILENZ, OF LANSING, MICHIGAN.

ATTACHMENT FOR TURRET LATHES.

Application filed September 12, 1921. Serial No. 499,886.

*To all whom it may concern:*

Be it known that I, WILLIAM G. CANNOM, a citizen of the United States, residing at Lansing, in the county of Ingham and State of Michigan, have invented a new and useful Improvement in Attachments for Turret Lathes, of which the following is a specification.

My invention relates to automatic screw cutting turret lathes and especially to such lathes as are used with self opening screw cutting die heads in which the opening device is actuated by stopping the motion of the turret head.

Its purposes are to make a device that shall be simple in construction, capable of the utmost exactness in adjustment, applicable to any ordinary form of turret lathe and self opening screw cutting head of the type specified.

I attain these purposes by the means shown in the accompanying drawings in which Fig. 1 is a plan view of my device, the turret and screw cutting head being shown in diagram. Figures 2 and 3 are details which will be more fully described hereafter. Fig. 4 is a plan and partial cross section of one form of die head on the line Y—Y of Fig. 5, Fig. 5 is a cross section on the line W—W of Fig. 6, and Fig. 6 is a cross section on the line X—X of Fig. 5.

Referring more particularly to the drawings, 1 is a turret which is of any ordinary approved type and forms no part of my invention. It may have any desired number of sides which, as is usual, are pierced with openings 2 for the insertion of tools in a manner well known to all those familiar with the art. 3 is a self opening screw cutting head in which are mounted the chasers 4. The chasers 4 are operated by a revoluble member 13 in which is provided a plurality of cams 14 adapted to actuate the chasers 4. The chasers are normally maintained in the withdrawn position by spring 15, but may be forced inwardly by revolving the member 13 by handles 16, thus forcing the chasers into cutting position against the compression of the spring 15. When they reach this position, they are locked by pins 17 which are forced forward by springs 18 into openings 19 formed in the member 13. The member 20 is integrally formed with or secured to the sleeve 5 which is held in a fixed position which will be more fully explained farther on. The operation of the head will be better explained in connection with the operation of the device. While I have described a conventional form of the head, it must be understood that as already stated, this head may be of any approved type in which the device for opening the chasers is actuated by stopping the advancing motion of the turret. The head 3 is mounted in one of the openings 2 by a sleeve 5 and is secured in position in any approved manner, as, for example, by a bolt 6 shown in detail in Fig. 2. In the opposite end of the same opening 2 is mounted a nut 7, secured in position in any desired manner; for example, by a bolt 6 similar to that used in the other case. The bolt 6 or whatever means may be employed for securing the nut and head in position are those ordinarily used and sold with the turret. A threaded rod 8 passes through the nut 7 and is locked in position by a lock nut 9. The rod 8 is provided with a tip 10 adapted to engage with the end of the rod 11 upon which the thread is being cut. This tip 10 may be of any desired size according to the diameter of the rod 11; for example, for a very small rod, a tip like Fig. 3 may be used. These tips are screwed into the extremity of the rod 8 as shown in Fig. 1 and may be readily changed when desired. For easy removing they are provided with flattened portions 12 near their extremities.

In the operation of my device the rod 8 is adjusted so that the distance from the extremity of the tip 10 to the outside of the screw cutting portion of the chasers 4 is equal to the length of the thread to be cut. The turret is then pushed forward until the rod 11 engages with the chasers and the screw cutting continues until the end of the rod 11 comes in contact with the tip 10 when the turret necessarily ceases to advance. As the screw cutting continues, the members 13 and 3 are drawn forward, sliding on the member 20 against the compression of the springs 18 and 21. As soon as the pins 17 are withdrawn from the openings 19 by this sliding action, the spring 15 revolves the member 13 and cams 14 draw back the chasers 4. While I have described above the action of the conventional head illustrated in the drawing, it must be remembered that the difference in the various types of such heads and for the purpose of my invention it is only essential that the head should be as already stated of a type in which the opening device is brought into action by stopping the advancing motion of the turret. After completing the cutting of the thread the turret is drawn back, the threaded portion cut off to the desired length, the rod 11 pushed forward and the operation continued. No further adjustment being necessary until a change in the length of thread is desired.

I claim as my invention and desire to secure by Letters Patent:

1. The combination with a lathe turret and a screw cutting head provided with chasers adapted to automatically open when the said turret is prevented from advancing, of a nut mounted in said turret and a threaded rod in said nut adapted to stop the advancing motion of said turret by engaging with the end of the rod upon which the thread is being cut.

2. The combination with a lathe turret and a screw cutting head provided with chasers adapted to automatically open when the said turret is prevented from advancing, of a nut mounted in said turret and a threaded rod in said nut adapted to stop the advancing motion of said turret by engaging with the end of the rod upon which the thread is being cut, and means for locking said threaded rod in position.

3. The combination with a lathe turret and a screw cutting head provided with chasers adapted to automatically open when the said turret is prevented from advancing, of means mounted in said turret and disconnected from said head adapted to automatically stop the advancing motion of said turret by engaging with the end of the rod upon which the thread is being cut.

4. The combination with a lathe turret and a screw cutting head provided with chasers adapted to automatically open when the said turret is prevented from advancing of adjustable means mounted in said turret and disconnected from said head adapted to automatically stop the advancing motion of said turret by engaging with the end of the rod upon which the thread is being cut.

WILLIAM G. CANNOM.

Witness:
   JOHN McCLELLAN.